(12) United States Patent
Tian

(10) Patent No.: US 11,820,508 B2
(45) Date of Patent: Nov. 21, 2023

(54) COMBINED VERTICAL TAKEOFF AND LANDING UAV

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/058,262

(22) Filed: Nov. 22, 2022

(65) Prior Publication Data

US 2023/0159164 A1    May 25, 2023

(30) Foreign Application Priority Data

Nov. 22, 2021   (CN) .......................... 202122858831.0

(51) Int. Cl.
| | | |
|---|---|---|
| *B64C 39/02* | (2023.01) | |
| *B64U 70/20* | (2023.01) | |
| *B64U 70/80* | (2023.01) | |
| *B64U 10/00* | (2023.01) | |
| *B64U 80/82* | (2023.01) | |

(52) U.S. Cl.
CPC ............ *B64C 39/024* (2013.01); *B64U 10/00* (2023.01); *B64U 70/20* (2023.01); *B64U 70/80* (2023.01); *B64U 80/82* (2023.01)

(58) Field of Classification Search
CPC ...... B64C 39/024; B64U 10/00; B64U 70/20; B64U 70/80; B64U 80/82
See application file for complete search history.

(56) References Cited

U.S. PATENT DOCUMENTS

| | | | | |
|---|---|---|---|---|
| 2,359,275 A | * | 9/1944 | Anderson ................ | B64D 1/22 258/1.2 |
| 2,368,671 A | * | 2/1945 | Lombard ................. | B64D 1/02 294/82.34 |
| 2,843,337 A | * | 7/1958 | Bennett ................. | F16C 11/069 244/2 |
| 2,876,677 A | * | 3/1959 | Clark ....................... | B64D 1/04 294/82.26 |
| 2,940,793 A | * | 6/1960 | Benson .................... | B64D 1/02 294/82.33 |
| 3,003,717 A | * | 10/1961 | Booker .................... | B64D 5/00 244/114 R |

(Continued)

*Primary Examiner* — Medhat Badawi
(74) *Attorney, Agent, or Firm* — WPAT LAW, P.C.; Anthony King

(57) ABSTRACT

A combined vertical takeoff and landing UAV having a large vertical takeoff and landing UAV, a connecting device, and a small vertical takeoff and landing UAV. The connecting device having a clamping component and an adsorption component. The clamping component includes a clamping part, and a clamping groove is arranged on the clamping part. The clamping component having a snap-fitting part, and a snap-fitting groove is arranged on the snap-fitting part. The clamping groove and the snap-fitting groove are correspondingly set. A first holding space is arranged on the clamping part, and a second holding space is arranged on the snap-fitting part. The adsorption component comprises a first magnetic element located in the first holding space, and the adsorption component also comprises a second magnetic element, which is located in the second holding space.

9 Claims, 3 Drawing Sheets

(56) References Cited

U.S. PATENT DOCUMENTS

| | | | | |
|---|---|---|---|---|
| 3,056,624 | A | * | 10/1962 | Nardone ................. B64D 1/22 74/2 |
| 3,061,355 | A | * | 10/1962 | Cozzoli .................. B64D 1/22 258/1.2 |
| 3,163,401 | A | * | 12/1964 | Johnston ................ B64D 1/22 258/1.2 |
| 3,174,790 | A | * | 3/1965 | Bendl .................... B64D 1/22 74/89.37 |
| 3,194,598 | A | * | 7/1965 | Goldfuss ................ B64D 1/22 294/82.19 |
| 3,494,248 | A | * | 2/1970 | Wenger .................. B64D 1/02 294/82.26 |
| 5,000,398 | A | * | 3/1991 | Rashev .................. B64C 27/08 244/116 |
| 7,793,888 | B2 | * | 9/2010 | Padan .................... B64D 39/00 244/137.4 |
| 7,966,872 | B2 | * | 6/2011 | Lutke .................... B64D 5/00 73/147 |
| 8,740,134 | B2 | * | 6/2014 | Suzuki .................. G05D 1/104 244/75.1 |
| 8,950,698 | B1 | * | 2/2015 | Rossi .................... B64C 27/26 244/63 |
| 9,010,690 | B1 | * | 4/2015 | Al-Heraibi ............. B64D 17/00 244/100 R |
| 9,139,309 | B1 | * | 9/2015 | Al-Heraibi ............. B64F 1/10 |
| 9,656,768 | B2 | * | 5/2017 | Vuong .................. B64D 5/00 |
| 9,957,045 | B1 | * | 5/2018 | Daly .................... G05D 1/0027 |
| 10,086,939 | B2 | * | 10/2018 | Chiu .................... B64D 1/02 |
| 10,133,272 | B2 | * | 11/2018 | Davidson .............. G01S 19/071 |
| 10,179,648 | B2 | * | 1/2019 | Chin .................... B64D 5/00 |
| 10,249,200 | B1 | * | 4/2019 | Grenier ................ G05D 1/0094 |
| 10,472,058 | B2 | * | 11/2019 | Tian .................... B64C 11/46 |
| 10,472,064 | B2 | * | 11/2019 | Tian .................... B64C 39/024 |
| 10,752,357 | B2 | * | 8/2020 | von Flotow ........... B64U 70/20 |
| 10,933,997 | B2 | * | 3/2021 | Hayes .................. B64C 39/024 |
| 10,967,970 | B2 | * | 4/2021 | Van Niekerk ......... B64C 39/024 |
| 11,148,808 | B2 | * | 10/2021 | Wiggerich ............ B64C 39/024 |
| 11,226,617 | B2 | * | 1/2022 | Deng .................... H04N 23/66 |
| 11,332,239 | B2 | * | 5/2022 | Tian .................... B64C 29/0025 |
| D972,975 | S | * | 12/2022 | Tian .................... D12/328 |
| 11,542,004 | B2 | * | 1/2023 | Velazquez ............ B64C 39/024 |
| 2006/0151666 | A1 | * | 7/2006 | VanderMey ........ B64C 29/0016 244/12.3 |
| 2007/0187547 | A1 | * | 8/2007 | Kelly .................... B64B 1/20 244/7 R |
| 2008/0087762 | A1 | * | 4/2008 | Holloman ............ B64C 1/0009 244/30 |
| 2009/0152391 | A1 | * | 6/2009 | McWhirk .............. B64B 1/70 244/30 |
| 2014/0048654 | A1 | * | 2/2014 | Williamson ........... B64D 1/12 244/137.4 |
| 2014/0158812 | A1 | * | 6/2014 | Luther .................. B64C 39/10 244/2 |
| 2016/0311526 | A1 | * | 10/2016 | Geise ................... B64C 27/52 |
| 2016/0368596 | A1 | * | 12/2016 | Zhang .................. B64C 27/006 |
| 2016/0378108 | A1 | * | 12/2016 | Paczan ................. G05D 1/104 705/330 |
| 2018/0135723 | A1 | * | 5/2018 | Tian .................... B64D 47/08 |
| 2018/0196418 | A1 | * | 7/2018 | Meier .................. G05D 1/0011 |
| 2018/0305018 | A1 | * | 10/2018 | Tian .................... G05D 1/0094 |
| 2018/0319496 | A1 | * | 11/2018 | Zhang .................. B64C 1/30 |
| 2018/0327090 | A1 | * | 11/2018 | De Chassey ......... B64C 39/024 |
| 2019/0016476 | A1 | * | 1/2019 | Scherz .................. B64U 50/19 |
| 2019/0100307 | A1 | * | 4/2019 | Beltman ............... G05D 1/104 |
| 2019/0100313 | A1 | * | 4/2019 | Campbell ............ B64C 29/0033 |
| 2019/0127056 | A1 | * | 5/2019 | Weekes ................ B64C 27/26 |
| 2019/0193834 | A1 | * | 6/2019 | Deng .................... B64U 30/20 |
| 2019/0233077 | A1 | * | 8/2019 | Tian .................... B64C 27/26 |
| 2019/0233098 | A1 | * | 8/2019 | Tian .................... B64C 11/46 |
| 2019/0233107 | A1 | * | 8/2019 | Tian .................... B64U 50/19 |
| 2019/0245365 | A1 | * | 8/2019 | Farrahi Moghaddam .................... H02J 7/0044 |
| 2020/0031498 | A1 | * | 1/2020 | Guo ..................... H02J 7/0049 |
| 2020/0086982 | A1 | * | 3/2020 | Wang .................... B64U 10/13 |
| 2020/0183381 | A1 | * | 6/2020 | Deng .................... G05D 1/0094 |
| 2020/0259378 | A1 | * | 8/2020 | Ueda .................... H02K 15/03 |
| 2020/0283148 | A1 | * | 9/2020 | Shu ...................... B05B 3/1007 |
| 2020/0406773 | A1 | * | 12/2020 | Lacaze ................. B64C 39/022 |
| 2021/0339845 | A1 | * | 11/2021 | Milan ................... B64D 45/00 |
| 2021/0362866 | A1 | * | 11/2021 | Tian .................... B64U 30/10 |
| 2021/0380241 | A1 | * | 12/2021 | Dichter ................ B64D 1/12 |
| 2022/0001996 | A1 | * | 1/2022 | Tian .................... B64U 10/10 |
| 2022/0041279 | A1 | * | 2/2022 | Rowse ................. G05D 1/104 |
| 2022/0041280 | A1 | * | 2/2022 | Tian .................... B64C 29/0025 |
| 2022/0227490 | A1 | * | 7/2022 | Tian .................... B64D 33/08 |
| 2022/0274493 | A1 | * | 9/2022 | Dunn ................... B65D 88/14 |
| 2022/0324564 | A1 | * | 10/2022 | Meade .................. B64D 1/18 |
| 2022/0380015 | A1 | * | 12/2022 | Tian .................... B64C 39/024 |
| 2022/0380045 | A1 | * | 12/2022 | Tian .................... B64C 29/0008 |
| 2022/0380047 | A1 | * | 12/2022 | Tian .................... B64U 10/20 |
| 2022/0388634 | A1 | * | 12/2022 | Tian .................... B64C 25/10 |
| 2022/0396421 | A1 | * | 12/2022 | Tian .................... B65D 90/14 |

\* cited by examiner

COMBINED VERTICAL TAKEOFF AND LANDING UAV

CROSS-REFERENCES

This application claims priority to China Pat. No. 202122858831.0, filed on Nov. 22, 2021, which is hereby incorporated by reference in its entirety.

Although incorporated by reference in its entirety, no arguments or disclaimers made in the related application apply to this application. Any disclaimer that may have and occurred or might occur during the prosecution of the above-referenced application is hereby expressly rescinded.

FIELD OF THE DISCLOSURE

The application relates to the technical field of UAV manufacturing, in particular to a combined vertical takeoff and landing UAV.

BACKGROUND OF THE INVENTION

With the development of current technology and UAV industry, an increasing number of UAVs are known to the public. At present, more and more industries and individuals are using UAVs to perform various tasks. The existing UAVs missions are usually conducted by ordinary single-frame UAV. Although this kind of UAVs is quite common in conducting missions, this kind of UAVs cannot work normally in some special scenarios. Even if the composite configuration UAVs have been produced with the existing technology, solid and reliable connection still cannot be achieved due to limited connection approaches.

For example, the existing UAVs cannot conduct special operations that require extra-long endurance and extra-long distance due to factors like weight and cabin space. In addition, when conducting long distance missions, UAVs need to fly through complicated terrain, where high-altitude mountains might block signals and thus disrupt data transmission. As a result, the need for a composite UAV which provides stable and reliable connection is increasingly important.

SUMMARY OF THE INVENTION

The application aims to solve the technical problem: a small vertical takeoff and landing UAV is mounted on the lower part of a large vertical takeoff and landing UAV, which can effectively expand the flight time and the flight range of the UAV to conduct special missions like extralong distance inspection. In addition, the large UAV can hover at high altitude and play a relay role in communication with the small UAV when they are operating at a high altitude and long distance. At the same time, a connecting device between the large UAV with the small UAV includes a clamping component and an adsorption component. The configuration of double connecting parts makes the connection performance of the combined vertical takeoff and landing UAV more stable and reliable.

To this end, the application uses the following technical solution:

The application relates to a combined vertical takeoff and landing UAV, which comprises:

A large vertical takeoff and landing UAV, which is provided with a connecting device.

A small vertical takeoff and landing UAV, which is connected to the large vertical takeoff and landing UAV by the connecting device.

The connecting device comprises a clamping component and an adsorption component.

The clamping component comprises a clamping part on which a clamping groove is arranged.

The clamping component comprises a snap-fitting part on which a snap-fitting groove is arranged. The clamping groove and snap-fitting groove are correspondingly set, which makes the snap-fitting groove be clamped inside the clamping groove.

A first holding space is arranged on the clamping part, and a second holding space is arranged on the snap-fitting part.

The adsorption component comprises a first magnetic element which is located in the first holding space.

The adsorption component comprises a second magnetic element which is located in the second holding space.

Furthermore, the large vertical takeoff and landing UAV also comprises a controller which is arranged in the large vertical takeoff and landing UAV. The controller is electrically connected with the adsorption component for controlling the adsorption and detachment of the adsorption component.

Furthermore, the first magnetic element is the magnet with a weight of 75 kg and the second magnetic element is the magnet with a weight of 75 kg.

Furthermore, the outer end of the first magnetic element is wound with a coil.

Furthermore, there are two connecting devices.

Furthermore, the large vertical takeoff and landing also comprises a sensor, which is arranged at one end of the first holding space on the clamping part.

Furthermore, the sensor is a limit sensor.

Furthermore, the large vertical takeoff and landing UAV also comprises a landing gear made of carbon fiber material.

Furthermore, the clamping part is connected to the snap fitting part through interference fit method.

The benefit of the application is:

The application provides a combined vertical takeoff and landing UAV, comprising a large vertical takeoff and landing UAV equipped with a connecting device, a small vertical takeoff and landing UAV connected to the large vertical takeoff and landing UAV by the connecting device. The connecting device comprises a clamping component and an adsorption component. The clamping component includes a clamping part, and a clamping groove is arranged on the clamping part. The clamping component comprises a snap-fitting part, and the snap-fitting groove is arranged on the snap-fitting part. The clamping groove and the snap-fitting groove are correspondingly set. A first holding space is arranged on the clamping part, and a second holding space is arranged on the snap-fitting part. The adsorption component comprises a first magnetic element located in the first holding space, and the adsorption component also comprises a second magnetic element located in the second holding space. The combined vertical takeoff and landing UAV can effectively expand the flight time and flight range of the UAV to conduct special missions like extra-long distance inspection. In addition, the large UAV can hover at high altitude and play a relay role in communication for the small UAV when they are operating at a high altitude and long distance. At the same time, a connecting device for connecting the large UAV with the small UAV includes a clamping component and an adsorption component. The configuration of double connecting parts makes the connection performance of the combined vertical takeoff and landing UAV more stable and reliable.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
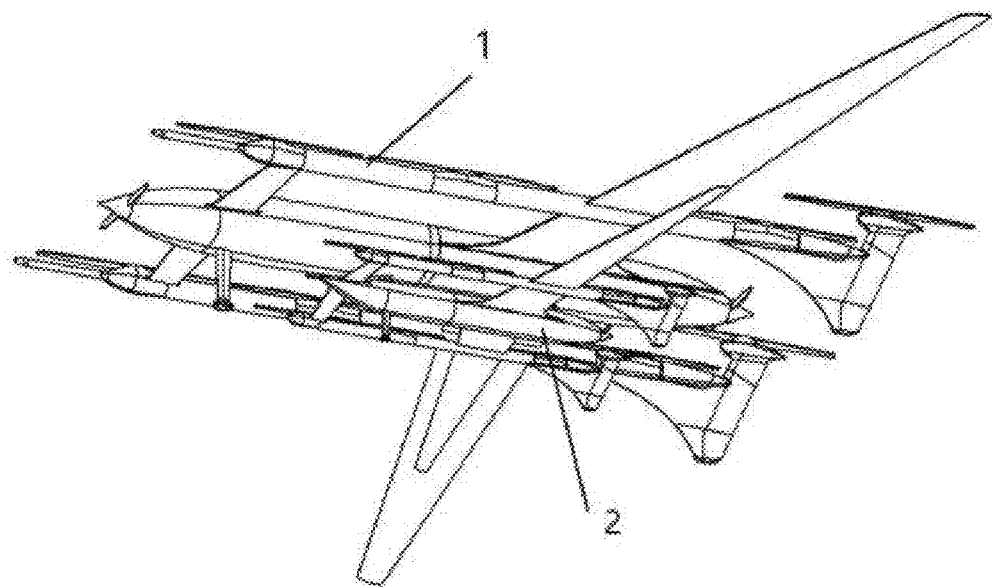
FIG. 1 is the side view of the combined vertical takeoff and landing UAV provided by the embodiment of the application.
Figure 2:
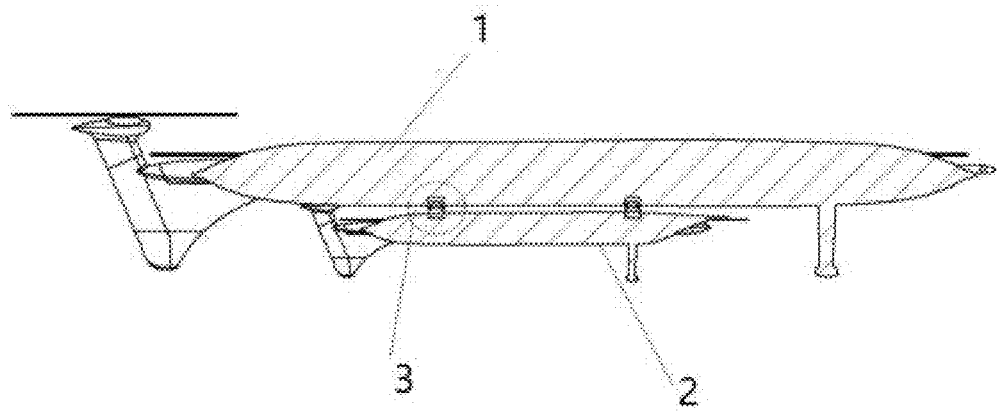
FIG. 2 is the sectional schematic view of the combined vertical takeoff and landing UAV provided by the embodiment of the application.
Figure 3:
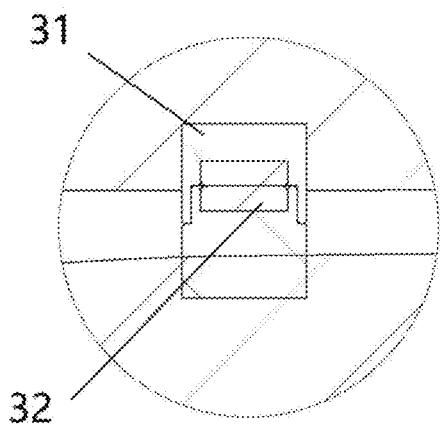
FIG. 3 is the partially magnified view of the combined vertical takeoff and landing UAV FIG. 2 provided by the embodiment of the application.
Figure 4:
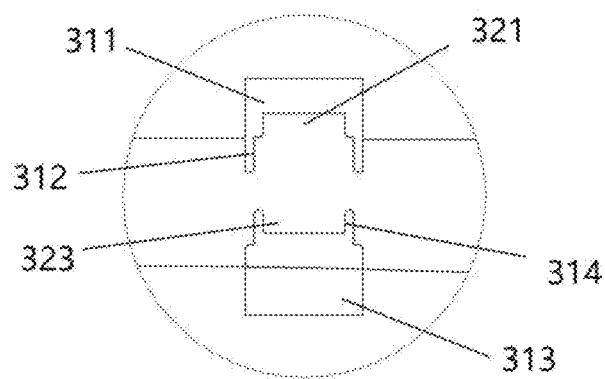
FIG. 4 is the partially magnified view of the combined vertical takeoff and landing UAV FIG. 2 without the magnetic elements provided by the embodiment of the application.
Figure 5:
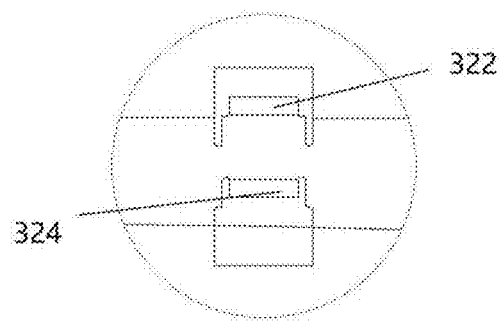
FIG. 5 is the diagram of a partially magnified explosion view of the combined vertical takeoff and landing UAV FIG. 2 provided by the embodiment of the application.

The following call-out list of elements in the drawing can be a useful guide when referencing the elements of the drawing figures:

1—large vertical takeoff and landing UAV, 2—small vertical takeoff and landing UAV, 3—connecting device, 1—clamping component, 32—adsorption component, 311—clamping part, 312—clamping groove, 13—snap-fitting part, 314—snap-fitting groove, 321—first holding space, 22—first magnetic element, 323—second holding space, 324—second magnetic element.

DETAILED DESCRIPTION

In order to make clear the technical problems, the solution and the technical effect in the application, which is further described in detail in combination with the attached drawings. Obviously, the embodiments described are only a part of the embodiments of the application rather than all embodiments. Based on the embodiment of the application, all other embodiments obtained by the technical personnel in the field without making creative labor belong to the scope of the protection of the application.

The application provides a combined vertical takeoff and landing UAV, as shown in FIG. 1-FIG. 5. The combined vertical takeoff and landing UAV comprises a large vertical takeoff and landing UAV 1 equipped with a connecting device 3, a small vertical takeoff and landing UAV 2 connected to the large vertical takeoff and landing UAV 1 by the connecting device 3. The connecting device 3 comprises a clamping component 31 and an adsorption component 32. The clamping component 31 includes a clamping part 311, and a clamping groove 312 is arranged on the clamping part 311. The clamping component 31 comprises a snap-fitting part 313, and a snap-fitting groove 314 is arranged on the snap-fitting part 313. The clamping groove 312 and the snap-fitting groove 314 are correspondingly set, which makes the snap-fitting groove (314) be clamped inside the clamping groove (312). A first holding space 321 is arranged on the clamping part 311, and a second holding space 323 is arranged on the snap-fitting part 313. The adsorption component 32 comprises a first magnetic element 322 located in the first holding space 321, and the adsorption component 32 also comprises a second magnetic element 324, which is located in the second holding space 323. The combined vertical takeoff and landing UAV provided a small vertical takeoff and landing UAV is attached to the body under the large vertical takeoff and landing UAV via a fixed device in this embodiment, which can meet the operation needs in complex terrain and environment. For example, in remote areas such as those with high-altitude mountains, communication signals can be blocked, or when operating in special environments that require extremely long endurance, the combined vertical takeoff and landing UAV can effectively extend the flight time and range and accomplish some special operations of ultra-long-distance inspection and monitoring. In addition, when operation missions require special needs such as high altitude and long distance, the large vertical takeoff and landing UAV can hover high in the sky, providing a relay for the small vertical takeoff and landing UAV to communicate, It solves the problem that existing ordinary drones cannot meet some special operations that require ultra-long flight time and ultra-long distance due to weight and cabin space limitations, and that UAV cannot transmit data over long distances due to long distances and blocking signals in the middle of high altitude mountains, etc.

The connecting device 3 for connecting the large vertical takeoff and landing UAV 1 with the small vertical takeoff and landing UAV 2 includes a clamping component 31 and an adsorption component 32. The configuration of double connecting parts makes the connection performance of the combined vertical takeoff and landing UAV more stable and reliable. Of course, the connecting device 3 is not limited to one, and can have more than one connecting device 3, two or even three, which is not restricted in this embodiment.

Specifically, as shown in FIG. 2-FIG. 5, a clamping part 311 is arranged on the large vertical takeoff and landing UAV, an inner groove is arranged on the clamping part 311. A snap-fitting part 313 is arranged on the small vertical takeoff and landing UAV, and the snap-fitting part 313 has a protrusion. The snap-fitting part 313 corresponds to the position of the clamping part 311 respectively, and the protrusion of the snap-fitting part 313 can match the groove of the clamping part 311. In this way, the snap-fitting part 313 can be connected to the clamping part 311, and the snap-fitting part 313 and the clamping part 311 together form the clamping component 31. Moreover, the snap-fitting part 313 may be optionally coupled with the clamping part 311 through interference fit to achieve a more stable and reliable connection between the small and large vertical takeoff and landing UAVs.

For example, in the present embodiment, a groove is provided on the clamping part 311 for matching the protrusion of the snap-fitting part 313. The extension direction of the inner groove of the clamping part 311 is parallel to the vertical axis of the body of the large vertical takeoff and landing UAV 1, the extension direction of the protrusion height of the snap-fitting part 313 is also parallel to the vertical axis of the body of the large vertical takeoff and landing UAV 1, so that the snap-fitting part 313 can smoothly touch with the clamping part 311.

Of course, in another embodiment, a groove is provided on the clamping part 311 for matching the protrusion of the snap-fitting part 313. The groove depth of the clamping part 311 extends in an angle of 5-175 degrees from the vertical axis of the body of the large vertical takeoff and landing UAV 1, and, of course, specifically, it can be 15 degrees, 30 degrees, 45 degrees, 60 degrees, 75 degrees, etc. The protrusion height of the snap-fitting part 313 extends in an angle of 5-175 degrees from the vertical axis of the body of the large vertical takeoff and landing UAV 1, and, of course, it could be 15 degrees, 30 degrees, 45 degrees, 60 degrees, 75 degrees, etc. So long as the angle formed by the protrusion height extension direction of the snap-fitting part 313 and the vertical axis of the body of the large vertical takeoff and landing UAV 1 is matched with the angle direction formed by the depth extension direction of the groove of the clamping part 311 and the vertical axis of the body of the large vertical takeoff and landing UAV 1, the snap-fitting part 313 can be smoothly connected to the clamping part 311.

In another embodiment, a controller is also provided on the combined vertical takeoff and landing UAV. The controller is arranged in the large vertical takeoff and landing UAV 1, and the controller is electrically connected with the adsorption component 32. The controller is used for controlling the adsorption and separation of the adsorption component 32. The controller is first connected to a power supply, and the current generates an electromagnetic field in the first magnetic element 322 and the second magnetic element 324. The magnetic field axis generated by the coil coincides with the magnetic field axis of the magnetic element. Thus, the magnetic field of the magnetic element itself is offset. The adsorption device loses adsorption capacity. The first magnetic element 322 and the second magnetic element 324 are disconnected from each other and are no longer attracted to each other. Subsequently, the large vertical takeoff and landing UAV 1 releases the small vertical takeoff and landing UAV 2 at the designated mission site to enable the small vertical takeoff and landing UAV 2 to continue to complete the mission. The connecting device 3 for connecting the large vertical takeoff and landing UAV 1 with the small vertical takeoff and landing UAV 2 includes a clamping component 31 and an adsorption component 32 at same time. The configuration of double connecting parts makes the connection performance of the combined vertical takeoff and landing UAV more stable and reliable.

It is understood that the connecting device 3 also includes several adsorption devices. Each adsorption device is composed of two magnets with an individual gravity of 75 kg, which are the first magnetic element 322 and the second magnetic element 324. A coil is arranged around the outside of the first magnetic element 322 and the second magnetic element 324 respectively. Further, a controller is arranged in the combined vertical takeoff and landing UAV, and the controller can be electrically connected with the magnet.

The working principle of the adsorption device is that the controller is connected to a preset power supply in the UAV body, and the on-off state of the controller can be controlled by the switch of the power supply. When the power supply is connected, the electromagnetic field is generated in the first magnetic element 322 and the second magnetic element 324, and the magnetic field axis generated by the coil coincides with the magnetic field axis of the magnetic element, offsetting the magnetic field of the magnetic element itself, which realize the first magnetic element 322 and the second magnetic element 324 are disconnected from each other. Similarly, when the power supply is disconnected, the electromagnetic field disappears, and the first magnetic element 322 and the second magnetic element 324 are attracted to each other. A more stable and reliable connection between the small vertical takeoff and landing UAV 2 and the large vertical takeoff and landing UAV 1 can be realized by the double effect of the clamping component 31 and the adsorption component 32.

In another embodiment, the large vertical takeoff and landing UAV 1 also includes a sensor disposed at one end of the first holding space 321 on the clamping part 311. In the process of snap-fitting, the sensor can make the process between the small vertical takeoff and landing UAV 2 and the large vertical takeoff and landing UAV 1 safer and more stable. There will not be over-clamping or even a collision leading to device deformation or overheating failure of clamping device. Optionally, the sensor can be either a limit sensor or any other type of sensor, such as a pressure sensor. As long as the sensor can detect the connecting position of the small vertical takeoff and landing UAV 2 when it is engaged with the large vertical takeoff and landing UAV 1. After detecting the connecting position or contact stress, the sensor will send the corresponding detected value back to UAV 1, and the UAV 1 will perform the next control command.

In another embodiment, the large vertical takeoff and landing UAV 1 also includes a landing gear to facilitate the landing and take-off of the combined vertical takeoff and landing UAV. Understandably, in order to reduce the weight of the UAV itself, the landing gear may be made of carbon fiber or other synthetic material, which is not restricted in this embodiment.

Figure 6:
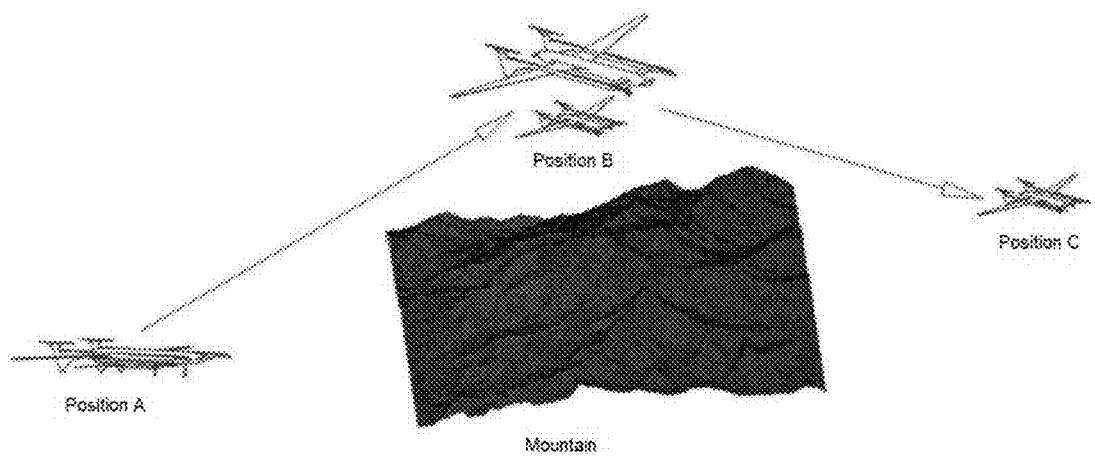
FIG. 6 is the diagram of the working process of the combined vertical takeoff and landing UAV provided by the embodiment of the application.

A specific usage method of the combined vertical takeoff and landing UAV of this embodiment is shown in FIG. 6:

S1: The large vertical takeoff and landing UAV 1 mounted with the small vertical takeoff and landing UAV 2 takes off from position A.

S2: The large vertical takeoff and landing UAV 1 flies to the designated point B and then releases the small vertical takeoff and landing UAV 2 below through the clamping component 31 and the adsorption component 32. The large vertical takeoff and landing UAV 1 can land and return, or hover in the air as a relay for the communication of the small vertical takeoff and landing UAV 2.

S3: The small vertical takeoff and landing UAV 2 released by the large vertical takeoff and landing UAV 1 continues to fly to the designated position C to continue operations.

In the description of the description, it should be noted that, the terms "Center", "Top", "Bottom", "Left", "Right", "Vertical", "Level", "Inside", "Outside" indicate a position or position relationship based on the position or position relationship shown in the attached drawings, for the sole purpose of facilitating and simplifying the description of the embodiment. The terms do not indicate or imply that the device or structure referred to must have a specific orientation or must be constructed and operated in a specific orientation. Therefore, it cannot be understood as a restriction to the application. In addition, the terms "First" and "Second" are used only to describe the purpose and cannot be understood as indicating the importance level. Wherein, the terms "First position" and "Second position" are two different positions.

In the statement of the description, the reference terms "An embodiment", "Example", and so on mean that the specific feature, structure or material described in combination with the embodiment or example is included in at least one embodiment or example of the application. In this specification, indicative representations of the above terms do not necessarily refer to the same embodiments or examples.

The terms "Installed", "Connected", "Combined", "Fixed" should be understood in a broad understanding unless otherwise specified. For example, they may be fixed or dismountable connections; mechanical or electrical connections; direct or indirect connections through an intermediary; an internal connection between two elements or interactions between two elements. For the ordinary technical personnel in the field, the concrete meaning of the above-mentioned terms in the application shall be understood according to specific conditions.

Unless otherwise specified, the first feature "Up" or "Down" on the second feature may include direct contact between the first feature and the second feature; it may also include first features and second features that are not in direct contact but are in contact with each other through additional features. Moreover, that the first feature is "Above", "Over" and "On" the second feature includes that the first feature is directly above and obliquely above the second feature, or it simply means that that the first feature has a higher horizontal height than the second feature. Moreover, that the first feature is "Below", "Underneath" and "Under" the second feature includes that the first feature is directly below and obliquely below the second feature, or it simply means that the first feature has a lower horizontal height than the second feature.

In addition, the above-mentioned is a better embodiment of the application and applied technical principles. technicians in the field will understand that the application is not limited to the particular embodiment described here. For the technicians in the field, various obvious changes, readjustments and substitutions will still be within the protection scope of the application. Therefore, although the application is described in detail through the above embodiment, the application is not only limited to the above embodiment, but further includes equivalent embodiments within the design of the application. The scope of the application is determined by the scope of the attached claims.

What is claimed is:

1. A combined vertical takeoff and landing UAV comprising:
    a first vertical takeoff and landing UAV (1), which is provided with a connecting device (3);
    a second vertical takeoff and landing UAV (2), which is connected to the first vertical takeoff and landing UAV (1) by the connecting device (3);
    wherein the connecting device (3) comprises a clamping component (31) and an adsorption component (32);
    wherein the clamping component (31) comprises a clamping part (311) on which a clamping groove (312) is arranged;
    wherein the clamping component (31) comprises a snap-fitting part (313) on which a snap-fitting groove (314) is arranged, the clamping groove (312) and snap-fitting groove (314) are correspondingly set, which makes the snap-fitting groove (314) be clamped inside the clamping groove (312);
    a first holding space (321) is arranged on the clamping part (311), and a second holding space (323) is arranged on the snap-fitting part (313);
    wherein the adsorption component (32) comprises a first magnetic element (322) located in the first holding space (321), and a second magnetic element (324) located in the second holding space (323).

2. The combined vertical takeoff and landing UAV according to claim 1, further comprises a controller, which is arranged in the first vertical takeoff and landing UAV (1), the controller is electrically connected with the adsorption component (32) for controlling an adsorption and detachment of the adsorption component (32).

3. The combined vertical takeoff and landing UAV according to claim 1, wherein the first magnetic element (322) is a magnet with a weight of 75 kg and the second magnetic element (324) is a magnet with a weight of 75 kg.

4. The combined vertical takeoff and landing UAV according to claim 3, wherein an outer end of the first magnetic element (322) is wound with a coil.

5. The combined vertical takeoff and landing UAV according to claim 1, further comprising a second liked connecting device (3).

6. The combined vertical takeoff and landing UAV according to claim 1, wherein the first vertical takeoff and landing UAV (1) further comprises a sensor, which is arranged at one end of the first holding space (321) on the clamping part (311).

7. The combined vertical takeoff and landing UAV according to claim 6, wherein the sensor is a limit sensor.

8. The combined vertical takeoff and landing UAV according to claim 1, wherein the first vertical takeoff and landing UAV (1) further comprises a landing gear made of carbon fiber material.

9. The combined vertical takeoff and landing UAV according to claim 1, wherein the clamping part (311) is connected with the snap fitting part (313) through an interference fit method.

* * * * *